(12) United States Patent
Brück et al.

(10) Patent No.: US 7,510,589 B2
(45) Date of Patent: Mar. 31, 2009

(54) METHOD FOR PRODUCING METAL FIBERS, METHOD FOR PRODUCING FILTER MATERIAL, DEVICE FOR PERFORMING THE METHOD, FIBER, FILTER MATERIAL, PARTICLE FILTER, AND MOTOR VEHICLE HAVING THE FILTER MATERIAL

(75) Inventors: Rolf Brück, Bergisch Gladbach (DE); Jan Hodgson, Troisdorf (DE); Thomas Härig, Neunkirchen-Seelscheid (DE); Peter Hirth, Rösrath (DE)

(73) Assignee: Emitec Gesellschaft Fuer Emissions-technologie mbH, Lohmar (DE)

( * ) Notice: Subject to any disclaimer, the term of this patent is extended or adjusted under 35 U.S.C. 154(b) by 18 days.

(21) Appl. No.: 11/702,988

(22) Filed: Feb. 6, 2007

(65) Prior Publication Data

US 2007/0151218 A1     Jul. 5, 2007

Related U.S. Application Data

(63) Continuation of application No. PCT/EP2005/008404, filed on Aug. 3, 2005.

(30) Foreign Application Priority Data

Aug. 6, 2004     (DE)     ........................ 10 2004 038 331

(51) Int. Cl.
*B01D 24/00*     (2006.01)
*B22F 5/00*     (2006.01)
*B21C 27/00*     (2006.01)
*B23P 15/28*     (2006.01)
*B26D 3/00*     (2006.01)
*B26D 1/00*     (2006.01)

(52) U.S. Cl. .................. 55/525; 428/600; 428/599; 407/8; 407/9; 407/10; 407/114; 407/115

(58) Field of Classification Search ............... 407/8–10, 407/114, 115; 55/525; 428/600, 599; 600/599
See application file for complete search history.

(56) References Cited

U.S. PATENT DOCUMENTS 4,298,660 A     11/1981     Nakagawa (Continued)

FOREIGN PATENT DOCUMENTS

DE     27 23 382 C3     12/1977

(Continued)

OTHER PUBLICATIONS

De Garmo E. Paul: "Materials and processes in manufacturing", 1984, XP-002532400.

(Continued)

*Primary Examiner*—Walter D Griffin
*Assistant Examiner*—Amber Miller Harris
(74) *Attorney, Agent, or Firm*—Laurence A. Greenberg; Werner H. Stemer; Ralph E. Locher

(57)     ABSTRACT

A method for producing metal fibers includes a machining production method using at least one rotating tool. A device for producing metal fibers, a filter material having such fibers, a method for producing the material, a particle filter using such material, a motor vehicle equipped with the filter, and a fiber, are also provided.

8 Claims, 3 Drawing Sheets

U.S. PATENT DOCUMENTS

| | | | |
|---|---|---|---|
| 4,514,520 A | | 4/1985 | Uytterhoeven et al. |
| 4,560,622 A | | 12/1985 | Tezuka et al. |
| 4,640,156 A | | 2/1987 | Nakagawa et al. |
| 4,949,511 A | * | 8/1990 | Endo et al. .................... 51/295 |
| 5,179,061 A | * | 1/1993 | Haerle ........................ 502/339 |
| 5,204,068 A | * | 4/1993 | O'Loughlin et al. ........ 422/180 |
| 5,215,724 A | * | 6/1993 | Haerle ........................ 422/180 |
| 6,200,072 B1 | * | 3/2001 | Andersson .................... 407/34 |
| 6,769,969 B1 | * | 8/2004 | Duescher .................... 451/59 |

FOREIGN PATENT DOCUMENTS

| | | |
|---|---|---|
| DE | 29 04 288 C2 | 8/1980 |
| DE | 33 41 776 A1 | 5/1984 |
| DE | 208 385 | 5/1984 |
| DE | 262 055 A1 | 11/1988 |
| DE | 38 26 480 A1 | 7/1989 |
| DE | 195 31 826 A1 | 2/1997 |
| DE | 197 11 048 A1 | 9/1998 |
| DE | 199 01 441 C1 | 5/2000 |
| EP | 0 087 496 A1 | 9/1983 |
| EP | 0 764 455 A2 | 3/1997 |
| EP | 0 864 395 A1 | 9/1998 |
| GB | 1 051 275 | 10/1964 |
| JP | 55-90235 | 7/1980 |
| JP | 58-71002 | 4/1983 |
| JP | 2000-167721 | 6/2000 |
| WO | WO 02/23019 A1 | 3/2002 |

OTHER PUBLICATIONS

Heiler, T.: Technisches Bildwoerterbuch fuer spanende Werkzeuge zur Metallbearbeitung (Technical picture dictionary for cutting tools for metalworking); 1964, XP-002352401.

* cited by examiner

METHOD FOR PRODUCING METAL FIBERS, METHOD FOR PRODUCING FILTER MATERIAL, DEVICE FOR PERFORMING THE METHOD, FIBER, FILTER MATERIAL, PARTICLE FILTER, AND MOTOR VEHICLE HAVING THE FILTER MATERIAL

CROSS-REFERENCE TO RELATED APPLICATIONS

This is a continuing application, under 35 U.S.C. §120, of copending International Application No. PCT/EP2005/008404, filed Aug. 3, 2005, which designated the United States; this application also claims the priority, under 35 U.S.C. §119, of German Patent Application DE 10 2004 038 331.6, filed Aug. 6, 2004; the prior applications are herewith incorporated by reference in their entirety.

BACKGROUND OF THE INVENTION

Field of the Invention

The invention relates to a method for producing metal fibers, a method for producing filter material, a device for performing the method, a fiber, a filter material, a particle filter and a motor vehicle having the filter material.

The exhaust gas systems of mobile internal combustion engines contain a wide range of different materials that are extremely subjected to high temperatures, aggressive gases and considerable vibrations. Despite those adverse ambient conditions, the materials have to maintain their function over the longest possible period. The function depends substantially on the type of exhaust gas treatment device formed with the materials. Possible exhaust gas treatment devices are catalytic converters, adsorbers, particle filters, mixers, insulating mats, seals, etc. The materials generally have to be resistant to high temperature and corrosion. In addition to ceramic materials, metal components are particularly suitable for that purpose.

In some cases, metal fibers are also employed in the above-mentioned exhaust gas treatment devices. There, metal fibers are becoming more and more a focus of attention, in particular as insulating material and filter material. Since they are components and materials that are used predominantly in automotive engineering, the development of a low-cost, high-output production method for such metal fibers is of particular interest. In view of the sensitivity and/or susceptibility to malfunction of the exhaust gas systems of mobile internal combustion engines that in some cases include very delicate electronic components, sensors, etc., it is especially important that the fiber materials have a long service life as well as the highest possible structural strength. It is only in that way that is it possible to prevent parts of the metal fibers from breaking away as a result of the considerable differences in temperature and pressure during operation. Such parts could then be carried along with the exhaust gas stream and collide with downstream exhaust gas treatment devices.

SUMMARY OF THE INVENTION

It is accordingly an object of the invention to provide a method for producing metal fibers, a method for producing filter material, a device for performing the method, a fiber, a filter material, a particle filter and a motor vehicle having the filter material, which overcome the hereinafore-mentioned disadvantages of the heretofore-known methods and devices of this general type. In particular, the methods should be capable of meeting the requirements of series production of exhaust gas treatment devices in automotive engineering. At the same time, the fibers produced should be as uniformly shaped as possible. Furthermore, a simply constructed device for the production of metal fibers, elements and components for the improved treatment of exhaust gases from mobile internal combustion engines should be proposed.

With the foregoing and other objects in view there is provided, in accordance with the invention, a method for producing metal fibers. The method comprises providing at least one metal block, and removing fibers from the at least one metal block by a machining production method using at least one rotating tool.

The term "fiber" is used to refer in particular to a fine, thin, longish formation. A fiber is consequently a formation in which the diameter is preferably far smaller than the length, in particular the ratio of length to diameter is at least 10, preferably 100 or even 1000.

The fibers are made of metal, so that the material corresponds substantially to that of the metal block being used. This metal is advantageously a ferrous material containing at least one of the constituents aluminum and chromium, preferably even both. The metal material is advantageously ductile and resistant to high temperature. The above-mentioned alloy constituents serve to provide high corrosion protection against the pollutants contained in the exhaust gas of mobile internal combustion engines.

The fibers are produced in this case by a machining production method to which the metal block is subjected, in which the rotating tool engages with a defined cutting edge into the metal block or its surface and removes the fibers from the solid material. The necessary (main) relative speed or (main) relative movement between the tool and the metal block is performed by the tool. It rotates about its own axis. This rotational movement, intrinsic in the tool, is superimposed by an additional translatory (auxiliary) relative movement between the metal block and the tool, the so-called infeed or feed, whereby the workpiece and the tool are moved towards one another with a predeterminable (generally constant) speed, so that the cutters of the tool penetrate into the metal block with a predeterminable penetration depth. In this way, uniform fibers are produced.

In accordance with another mode of the invention, the removal of fibers is performed through the use of front or face milling. In this context, milling is to be understood, in particular, as a machining production method with circular cutting motion of a generally multi-cutter tool to produce any desired workpiece surface finish. The cutting motion runs perpendicular or at an angle to the rotational axis of the tool. Milling methods are generally distinguished, for example, according to the surface finish being produced, the tool form (profile or outline) and/or the kinematics, among other things, into surface milling, circular milling, hob or roll milling, external milling and profile milling.

If the workpiece surface is produced from the front of the tool with so-called minor cutting edges, one speaks of front or face milling. Consequently, a milling process in which the surface is produced by the cutting edges around the circumference of the cutter is referred to as peripheral milling. Depending on the direction of the tool rotation and infeed, a further distinction is made between up milling and down milling. During up milling, the infeed movement and the cutting movement are in opposite directions, while during down milling they are in the same direction. With the (conventional) face milling method particularly preferred herein, the working length (corresponding substantially to the length of the fibers) is significantly larger than the cutting depth (corresponding substantially to the height of the fibers), and the workpiece surface is produced by the minor cutting edge, in other words the part of the cutter on the face of the milling tool. Face milling is preferably performed with an infeed rate in a range of from 10 μm to 100 μm [micrometers] per revolution.

The milling method proposed herein enables a very large number of uniform fibers to be produced in a particularly short time. This process is thereby generally repeated until the whole metal block has finally been consumed. It should also be pointed out in principle that a plurality of milling cutters can naturally also be employed simultaneously to machine down such a metal block, that coolant and/or lubricant can additionally be used and/or that other machining processes can take place in parallel (e.g. final grinding of the milled surface, etc.).

In accordance with a further mode of the invention, fibers with thicknesses in a range of from 10 μm to 100 μm [micrometers] are removed. The thickness preferably lies in a range of from 20 μm to 30 μm. The setting of the desired thickness, as well as the desired length and height of the fibers is respectively made by a corresponding choice of the rotational speed of the rotating tool and the infeed rate. At the same time, the geometries of the cutters in contact with the metal block also have to be taken into consideration.

In accordance with an added mode of the invention, fibers with a length in a range of from 1 mm to 50 mm [millimeters], preferably in a range of from 15 mm to 25 mm, are removed.

In accordance with an additional mode of the invention, fibers with a height in a range of from 10 μm to 100 μm [micrometers] are removed. In this case again, the preferred range lies between 20 μm and 30 μm.

The dimensions indicated herein are to be selected, in particular, for fibers that are employed as partial-components of exhaust gas treatment devices. The fibers then have the necessary cross sections to sustainably withstand the thermal and dynamic loads. Furthermore they ensure, for example, a specific surface area that is important for close contact with the exhaust gas. It should furthermore be taken into consideration that they thus create the possibility of producing suitable intersection points that are generated, for example, by linking several fibers. The resulting technical joining and/or material joining connections are sufficiently resistant.

In accordance with yet another mode of the invention, the at least one tool is rotated at a predeterminable speed and is moved with a predeterminable infeed rate relative to the at least one metal block, and the speed and infeed rate are selected in such a way that the fibers have a uniform thickness over at least 50% of their length. This ensures that the fibers substantially have the same form over at least a large proportion of their length, and that therefore sufficiently large contact regions are provided between adjacent fibers, especially for a subsequent assembly of the fibers to form a woven or knitted mesh, etc. The fibers advantageously have a uniform thickness over at least 80% of their length, preferably around or even above 90% or 95%. For the sake of clarification it should be pointed out that the expression "uniform thickness" is also to be understood as also covering certain manufacturing tolerances. The manufacturing tolerances to be subsumed to this term depend primarily on the manufacturing method. In this case, for milling, this could admissibly fluctuate e.g. in a range of ±20% around a mean value.

In accordance with a further mode of the invention, the at least one metal block has a machining front that substantially corresponds to a profile of the tool. This means, in particular, that the machining front, in other words the front of the metal block in which the rotating tool engages, substantially "nestles" against the profile or outline of the tool. This means, for example, that the machining front has a radius corresponding substantially to the radius of the tool. This is intended to ensure that the cutting parameters do not change during the whole machining process, in other words from the tool entry into, up to the tool exit from, the metal block. For this purpose, it is advantageous if a corresponding rear wall of the metal block is provided that thus has the same radius as the tool. The machining front thus advantageously has a concave form, while the rear wall has a convex form. The rotating tool must thereby be positioned in the middle of the machining front and provided with an infeed.

In accordance with yet an added mode of the invention, the machining production method in adjacent planes is performed consecutively, so that the at least one rotating tool engages in the at least one metal block with an offset in adjacent planes. This is based on the concept that during machining of the metal block, unevenesses, e.g. scores, grooves, elevations, etc. are created in the surface near the cutting edge. It is now proposed herein that in a subsequent machining step in which the next upper layer of the metal block is removed, an offset is produced in such a way that the unevenesses now formed are not located in a perpendicular plane to the unevenesses of the plane above. The offset preferably lies in the range of half the thickness of the fibers. Depending on the setting of the infeed or rotational speed and the number of cutters, it is thus possible under certain circumstances to generate predetermined fracture points in the fibers. These then permit a simple further reduction in the cross section of the fibers by additional machining steps. In addition, special, for example practically round, ellipse-shaped or polygonal cross sections, can thus be created.

With the objects of the invention in view, there is also provided a method for producing filter material. The method comprises initially producing fibers according to the method of the invention, and then technically joining the fibers together to form a gas-permeable layer. Additional material can be used for the technical joining process, but it is also possible for the fibers to bond together under the effect of pressure and/or temperature (e.g. welding, sintering, etc.).

The fibers can thereby be aligned with one another or can be positioned chaotically. This ultimately forms a gas-permeable layer in which the fluid or gas can flow through voids in the layer formed by the fibers. The layer preferably has a layer thickness in a range of less than 4 mm [millimeters], in particular less than 2 mm. The configuration of the fibers relative to one another provides a porosity in the layer averaging between roughly 40% and 90%. This layer is preferably used to trap soot particles or other solids carried in the exhaust gas stream of an engine. For this purpose, the filter material can include further materials such as e.g. a coating, metal foam, ceramic foam, supporting structure, catalytic converter, etc.

With the objects of the invention in view, there is furthermore provided a device for producing metal fibers. The device comprises a workpiece holder for fixing at least one metal block, and at least one rotating tool to be brought into engagement with the at least one metal block for performing the method according to the invention. The at least one rotating tool includes a multi-cutting-edge cutter, in particular a face miller.

The term miller is used to refer in particular to tools for chip removal having several cutting edges or the cutting edge of which has multiple slots or interruptions. The cutting edges of the miller are preferably uniformly spaced from one another and are disposed around the circumference and/or on one face side. Of particular preference in this context is a knee-andcolumn NC universal milling machine. The height-adjustable tool table with the workpiece holder additionally performs a two-dimensional horizontal movement (e.g. to effect the infeed). The third travel axis (e.g. for setting the cutting depth) lies in the headstock for the drive of the rotating, multi-cutting-edge face miller.

As an alternative, the cross-bed structure can also be employed where reference is made to the embodiments in which two vertical infeed movements are performed on the bed, with the one being assigned to the tool carrying assembly (normally pillars) and the other to the workpiece carrying assembly (normally tables). There are different possibilities for effecting these movement axes. The horizontal movement is preferably performed by the table or workpiece holder, while the vertical movement is performed by the rotating tool.

A face milling head with tool cassettes is preferably employed as the face miller, with clamped indexable carbide tips, for example, being used as cutters. This type of face milling head has a diameter of up to 250 mm [millimeters]. In the present application, cutting speeds ($v_c$) in a range of from 1 to 20 m/min [meters per minute], an infeed per tooth ($f_z$) in a range of from 0.02 to 0.1 mm [millimeters] and a cutting depth ($a_e$) in a range of from 0.02 mm to 0.1 mm [millimeters] are employed.

With the objects of the invention in view, there is additionally provided a fiber produced by the method or the device according to the invention. The fibers produced with the method according to the invention or the device according to the invention are distinguished by high geometric precision and thus form the basis for exhaust gas treatment components that can be sustainably employed in the exhaust gas system of mobile internal combustion engines.

With the objects of the invention in view, there is also provided a filter material, comprising fibers produced by the method or the device according to the invention. A filter material can, for example, be formed at least partly from such fibers. The exhaust gas flows through the filter material in such a way that particles or solids contained in the exhaust gas are respectively deposited on the fibers and on a coating provided thereon. The filter material can now be regenerated continuously or discontinuously at defined points in time, where the solids are converted at least partially into gaseous constituents, through the use of reduction agents or in some other way, for example by increasing the temperature.

With the objects of the invention in view, there is furthermore provided a particle filter, comprising filter material produced by the method or the device according to the invention. This type of filter material allows, for example, particle filters for exhaust gas systems of different engines (diesel engine, spark-ignition engine, etc.) to be provided that are distinguished by a long service life and high effectiveness. The particle filter can be made only of the filter material, but it is preferable that the filter material forms only part of the particle filter. In a particularly preferred embodiment, channels are formed with at least partially structured sheet metal layers, with the filter material at least partially limiting a wall of such a channel. The sheet metal foils are constructed in such a way that the exhaust gas passing through or the particles contained therein are deflected towards the filter material and therefore the particles passing through the filter materials are deposited in the filter material.

With the objects of the invention in view, there is concomitantly provided a motor vehicle, comprising at least one exhaust gas treatment component having filter material or at least one particle filter according to the invention. It is particularly advantageous to integrate at least one exhaust gas treatment component with filter material and/or a particle filter of the type described above into a motor vehicle. The term motor vehicle is meant herein to refer in particular to passenger cars, trucks, motor boats, motor aircraft, etc.

Other features which are considered as characteristic for the invention are set forth in the appended claims.

Although the invention is illustrated and described herein as embodied in a method for producing metal fibers, a method for producing filter material, a device for performing the method, a fiber, a filter material, a particle filter and a motor vehicle having the filter material, it is nevertheless not intended to be limited to the details shown, since various modifications and structural changes may be made therein without departing from the spirit of the invention and within the scope and range of equivalents of the claims, noting that features formulated individually in the claims can be combined with one another in any technologically expedient manner to result in further embodiments of the invention and that the content of the description can be used for details of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
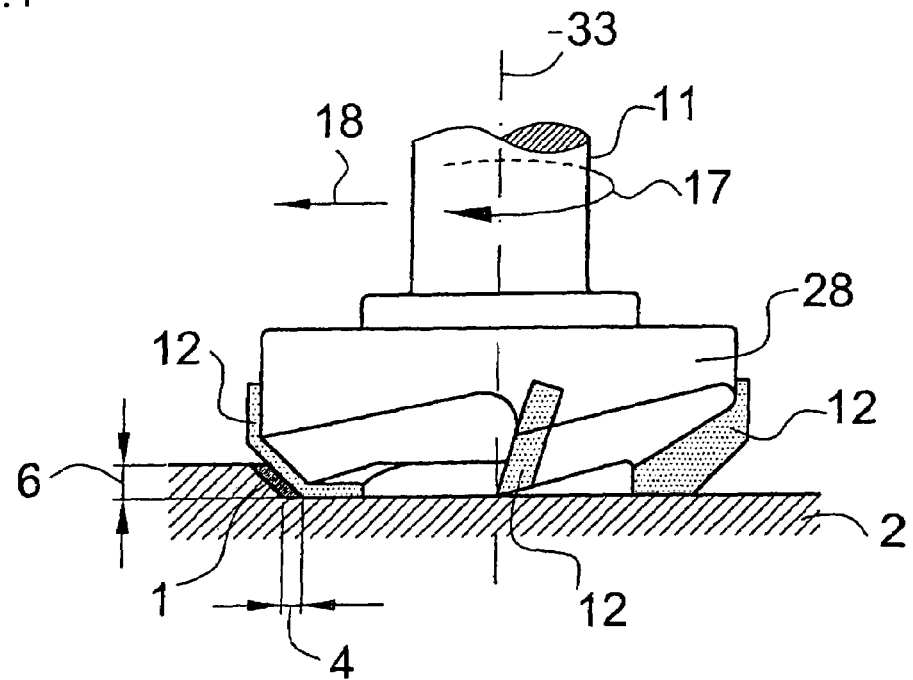
FIG. 1 is a fragmentary, diagrammatic, side-elevational view illustrating machining of a metal block through the use of a rotating tool.

Referring now to the figures of the drawings in detail and first, particularly, to FIG. 1 thereof, there is seen a side view of a face miller or face-milling cutter 11 that can be rotated about its axis 33 in a direction of rotation 17. The face miller 11 includes a main body 28 with several cutters 12. In the embodiment shown, the face miller 11 has four cutters 12 disposed uniformly around its circumference, but it can also have six cutters, eight cutters, twelve cutters or even more cutters. The face miller 11 is moved in an infeed or feed direction 18 towards a metal block 2. This relative movement is generally generated by the metal block 2 or by a workpiece table. During the course of the method, the cutters 12 engage the metal block 2, so that fibers 1 with a height 6 and a thickness 4 are cut out.

Figure 2A:
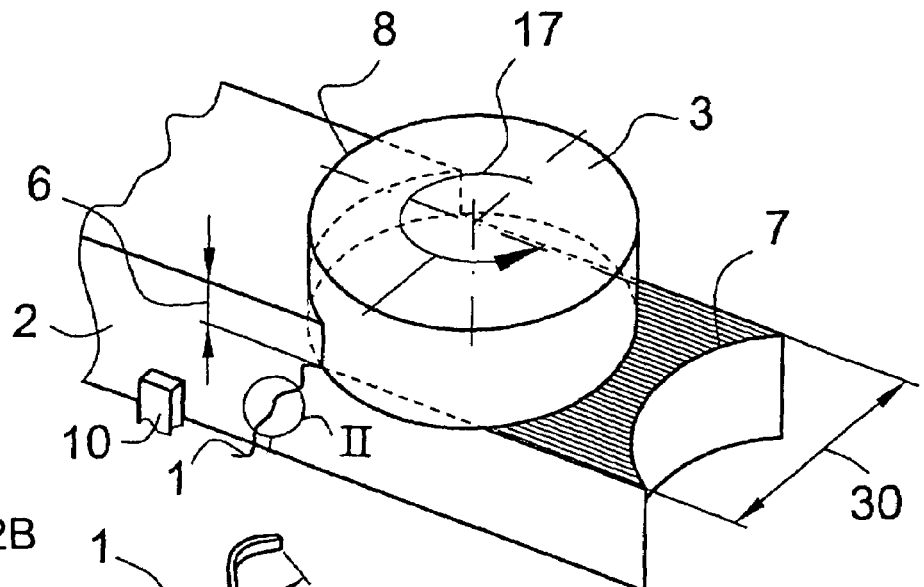
FIG. 2A is a fragmentary, perspective view illustrating a face milling process.

FIG. 2 shows the device and the method for producing the fibers 1 diagrammatically and in a perspective view. The metal block 2 is fixed by a workpiece holder 10. In order to ensure uniform penetration of a rotating tool 3 into the metal block 2, the metal block has a machining front 7 that corresponds substantially to a profile or outline 8 of the tool 3. In this case, the profile is the profile 8 of the tool 3 that makes initial contact with the metal block 2. In the embodiment shown, the rotating tool 3 has a diameter that is larger than a width 30 of the metal block 2. This is therefore the (conventional) face milling production method in which the metal block 2 is machined away in individual layers along predetermined machining planes, thereby producing the fibers 1. The fiber 1 is again shown in detail in FIG. 2A. In particular, the height 6, the thickness 4 and a length 5 of the fiber 1 are indicated in FIG. 2A.

Figure 3A:
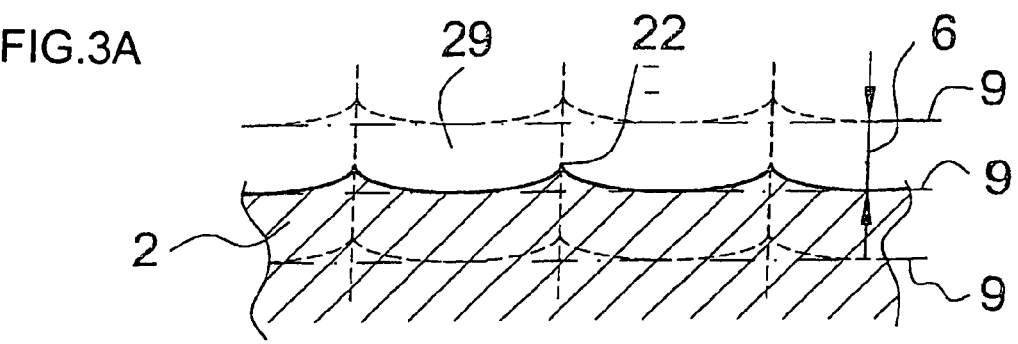
FIGS. 3A and 3B are enlarged, sectional views of the metal block after machining.
Figure 3B:
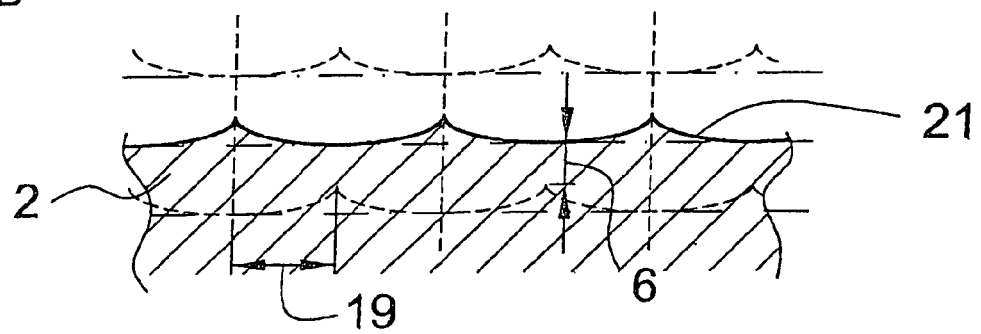

FIGS. 3A and 3B show two fragmentary views of the metal block 2 in cross section, illustrating, in particular, the surface condition of the metal block 2 after machining with the rotating tool 3. The removal of the fibers 1 from the metal block 2 is performed in different planes 9 that preferably are disposed at a constant distance from one another. The machining with the cutters 12 of the rotating tool 3 generates non-smooth surfaces 21 so that, in particular, elevations 22 are formed as shown.

In the production variant shown in FIG. 2A, the elevations 22 of adjacent planes 9 lie in a substantially perpendicular line or plane. This means that all of the fibers 1 are produced with a cross section 29 having the same height 6 over the whole thickness 4.

Figure 2B:
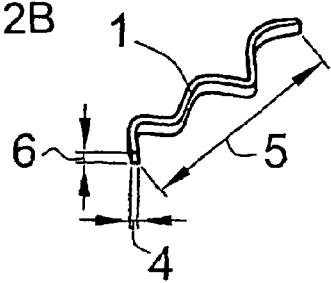
FIG. 2B is an enlarged, perspective view of a portion II of FIG. 2A.

By contrast, an offset 19 between the adjacent planes 9 has been created in the method variant shown in FIG. 2B. This creates fibers 1 with a varying height 6, in which the smallest height 6 is formed in the middle of the thickness 4 of the fiber 1 when the offset 19 corresponds roughly to half the thickness 4 of the fiber 1.

Figure 5:
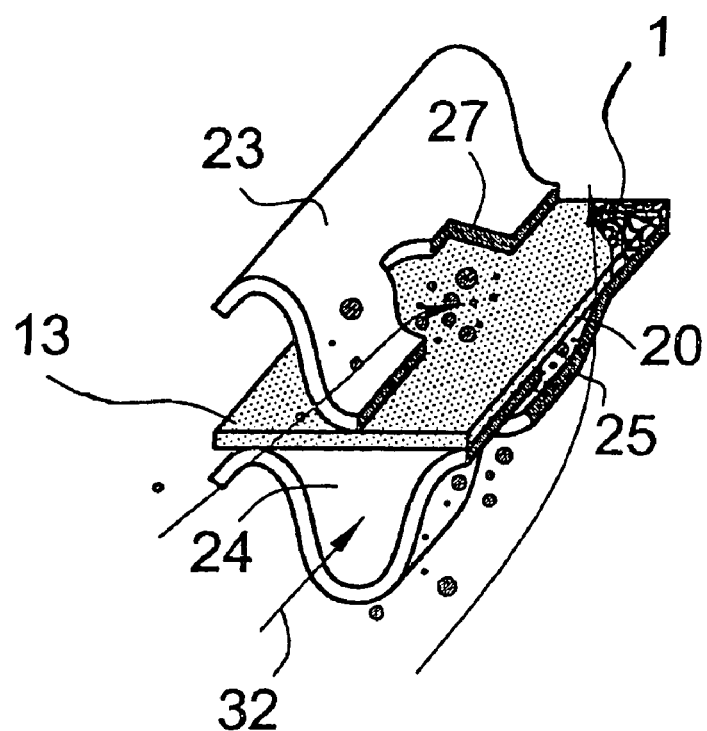
FIG. 5 is a further enlarged, fragmentary, perspective view of the particle filter in a portion V of FIG. 4.

FIG. 5 diagrammatically illustrates a preferred application of such fibers 1 in the automotive sector. The fibers 1 have been linked in this case to form a layer 20 and a coating has been applied. This layer 20 is disposed between partially structured metal foils 23 that form several channels 24 disposed parallel to one another. The metal foils 23 also have a microstructure 27 that effects a deflection of exhaust gases towards a filter material 13 or the fiber layer 20. The exhaust gas thereby flows first in a flow direction 32 into the channels 24 and is then deflected due to the microstructure 27 so that soot 25 contained therein is deposited in the layer 20. The soot 20 is continuously regenerated.

Figure 4:
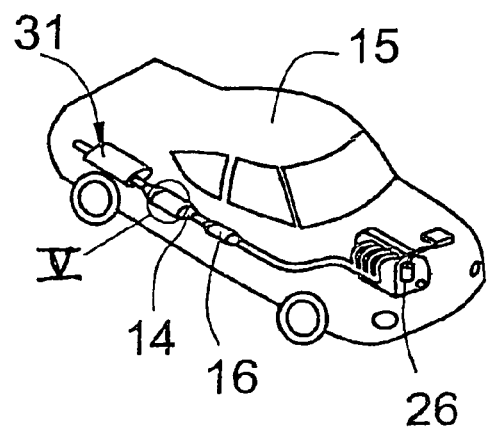
FIG. 4 is a perspective view of a motor vehicle with a particle filter having fibers.

The fragmentary view illustrated in FIG. 5 is taken from a portion V of a particle filter 14 positioned in an exhaust gas system 31 of a mobile internal combustion engine 26 of a motor vehicle 15, seen in FIG. 4. Upstream of the particle filter 14, i.e. between the internal combustion engine 26 and the particle filter 14, is a further exhaust gas treatment component 16, for example an oxidation catalytic converter, that converts nitrous oxides contained in the exhaust gas to permit a continuous regeneration of the soot 25 in the particle filter 14.

We claim:

1. A method for producing metal fibers, the method comprising:
    a) providing at least one metal block; and
    b) removing fibers from the at least one metal block by a machining production method using at least one rotating tool;
    performing the machining production method consecutively in adjacent planes of the at least one metal block, and engaging the at least one rotating tool in the at least one metal block with an offset in adjacent planes.

2. The method according to claim 1, which further comprises performing step b) by face milling.

3. The method according to claim 1, which further comprises removing the fibers with a thickness in a range of from 10 µm to 100 µm in step b).

4. The method according to claim 1, which further comprises removing the fibers with a length in a range of from 1 mm to 50 mm in step b).

5. The method according to claim 1, which further comprises removing the fibers with a height in a range of from 10 µm to 100 µm in step b).

6. The method according to claim 1, which further comprises:
    rotating the at least one tool at a predeterminable speed;
    moving the at least one tool at a predeterminable infeed rate relative to the at least one metal block; and
    selecting the speed and the infeed rate to provide the fibers with a uniform thickness over at least 50% of a length of the fibers.

7. The method according to claim 1, which further comprises providing the at least one metal block with a machining front substantially corresponding to a profile of the tool.

8. A method for producing filter material, the method comprising the following steps:
    initially producing fibers according to claim 1, and
    then technically joining the fibers together to form a gas-permeable layer.

* * * * *